United States Patent

[11] 3,625,552

[72] Inventors George A. Mahoff;
    Leonard L. Rice, both of 1654 Lincoln
    Blvd., Santa Monica, Calif. 90404
[21] Appl. No. 856,866
[22] Filed May 5, 1969
[45] Patented Dec. 7, 1971
    Continuation-in-part of application Ser. No.
    33,437, June 2, 1960, now abandoned,
    Continuation of application Ser. No.
    572,617, Aug. 15, 1966, now abandoned,
    which is a continuation of application Ser.
    No. 33,437, Aug. 15, 1966, now
    abandoned. This application May 5, 1969,
    Ser. No. 856,866

[54] COUPLING SEAL
    22 Claims, 4 Drawing Figs.
[52] U.S. Cl. .................................................. 285/336,
                                                     285/340
[51] Int. Cl. .................................................. F16l 17/00
[50] Field of Search ........................................... 285/340,
        336, 339, 341, 342, 382.7, 330, 331, DIG. 18;
                                                     277/236

[56]            References Cited
            UNITED STATES PATENTS
2,840,395  6/1958  Tarnow ........................ 285/340 X 2,413,308  12/1946  Arnold ........................ 285/DIG. 18
2,992,840   7/1961  Reynolds et al. .............. 285/340 X
2,995,388   8/1961  Morello et al. ............... 285/340
3,016,249   1/1962  Contreras et al. ............. 285/340 X Primary Examiner—Reinaldo P. Machado
Assistant Examiner—Wayne L. Shedd
Attorney—Strauch, Nolan, Neale, Nies and Kurz ABSTRACT: A coupling assembly for first and second tubular fluid conducting members is provided. The first and second members include respectively first and second annular stepped portions axially overlapping and radially spaced. An annular metallic seal of resilient material of suitable polygonal cross section, preferably quadrilateral and symmetrical about a midplane normal to its axis in the absence of any loading thereon, is interposed axially and radially between the first and second stepped portions. When the members are urged axially towards each other, the seal is under compression and radially loaded only at a pair of diagonally opposite corner edges thereof to thereby provide high-unit pressure annular substantially line contact sealing between these edges and the members.

PATENTED DEC 7 1971　　3,625,552

INVENTORS
LEONARD L. RICE
GEORGE A. MAHOFF
BY Elliott & Pastoriza
ATTORNEYS

COUPLING SEAL

This application is a continuation-in-part of Ser. No. 33,437 filed June 2, 1960 entitled METHOD AND APPARATUS FOR FORMING IMPROVED COUPLING ASSEMBLY, now abandoned, and a continuation of copending Ser. No. 572,617 filed Aug. 15, 1966, now abandoned which was filed as a continuation of Ser. No. 33,437.

This invention relates generally to coupling assemblies for connecting together fluid lines, and more particularly concerns an improved metallic seal for use in a coupling assembly, wherein the seal is designed to be interposed radially between two overlapping end portions of the coupling unit. The specific improvement of the present invention primarily resides in providing a seal which functions properly despite considerable variations in environmental conditions such as changes in fluid pressure and temperature, whereby the sealing force is maintained throughout a wide range of differing application characteristics. The present invention is of particular utility with respect to coupling structures through which fluids are being pumped or circulated and in which a positive guarantee against leakage must be assured.

An object of the present invention is to provide a sealing member which is effective regardless of temperature or pressure variations in the fluid, or pressure or temperature differentials existing between the fluid and the particular environment in which the fluid line is disposed.

A further object of the present invention is to provide a sealing member for use in a coupling assembly which is susceptible of convenient installation and repeated usage.

Another object of the present invention is to provide an improved coupling assembly embodying a sealing means, in which the sealing means cofunctions with the coupling assembly structure to maintain a positive concentrated sealing pressure despite unusual environmental conditions to which the coupling unit or lines connected thereto may be subjected.

Still another object of the present invention is to provide an improved coupling assembly and sealing means embodied therein wherein the sealing member is so constructed that it can only be installed in the proper manner such that misassembly and resultant malfunctioning is not possible.

An additional object is to provide a coupling assembly which inherently effects a secondary seal in response to the primary sealing force.

Still a further object of the present invention is to provide an improved coupling assembly with a novel sealing means embodied therein which is susceptible of repeated usage and is not deformed permanently as a consequence of tightening of the coupling assembly.

Yet another object of the present invention is to provide an improved coupling assembly and sealing member embodied therein, wherein the sealing member may be manufactured economically from readily available materials and in which the sealing member may be used with relatively conventional coupling structures.

Still a further object of the present invention is to provide a method of forming a high-pressure seal in a coupling member connecting together the end portions of two fluid lines, wherein the coupling seal is maintained in a positive manner regardless of temperature or pressure variations to which the coupling structure or fluid flowing through the line may be subjected.

Still an additional object of the present invention is to provide a method of forming a coupling assembly wherein high pressures and unusual temperatures may be accommodated while still maintaining a positive seal.

These and other objects and advantages of the present invention are generally attained by providing a coupling assembly embodying axially overlapping radially spaced tubular end portions and a circular sealing member of quadrilateral cross section radially interposed between said end portions and slightly spaced therefrom. The sealing member is so designed that upon coupling of the tubular end portions to move them toward each other, the sealing member, as such, has only its two diagonally opposite corner edges engage under load the tubular end portions; otherwise, the seal has its outer diameter portion, its inner diameter portion, and its sides spaced, respectively, from said tubular end portions.

In one embodiment, the sides of the seal may act with the tubular end portions to fix the limits of the coupling action, although this is not a feature of the invention in its broader aspects.

In the above-mentioned application, of which the present application forms a continuation-in-part, applicants have pointed out generally certain of the features of the present invention. The purpose of the present application is to clarify and point out in greater detail certain features of this improved coupling assembly and in particular the metallic seal associated therewith.

A better understanding of the present invention will be had by now referring to the drawings, disclosing two embodiments of the improved coupling assembly and sealing means according to the present invention, and illustrating the method thereof, and in which.

Figure 1:
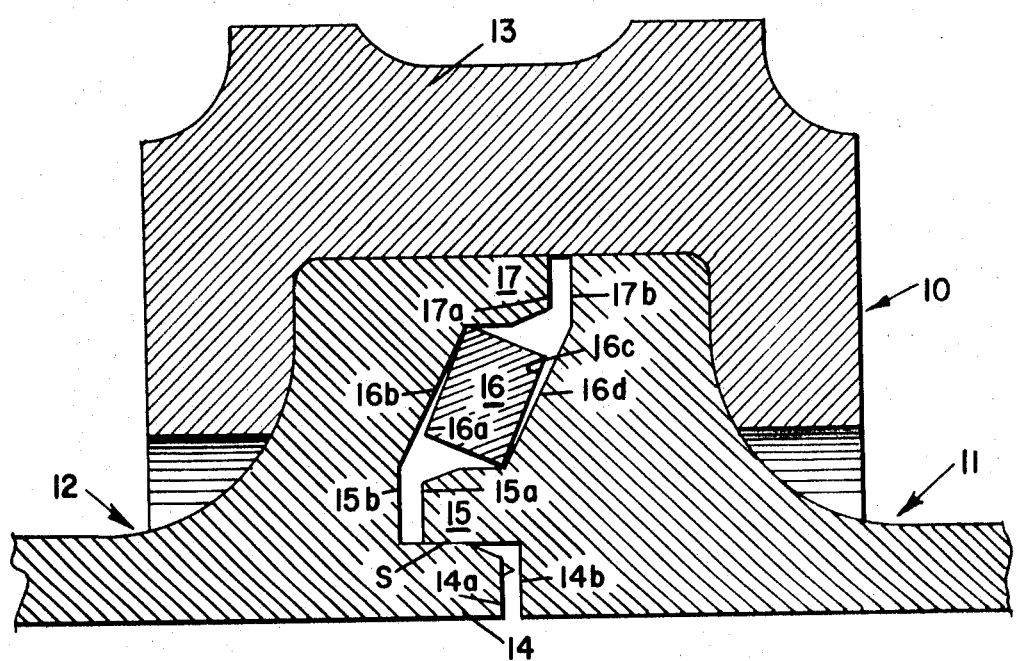
FIG. 1 is a partial sectional view through a partially made coupling assembly, according to the present invention, without the clamping means as such, being shown.

Referring now to the drawings, there is shown in FIG. 1 an improved coupling assembly including a coupling structure 10 which is designed to be received over a male flange 11 and a female flange 12. The coupling structure 10 may be provided with an outer peripheral portion 13 for connecting to clamping means (not shown) whereby the structure 10 may be forced downwardly over the flanges 11 and 12 to urge same together in a manner as hereafter described. Such clamping means embodying bolt and trunnion arrangements are well known in the art.

Considering now the coupling assembly in detail, the female flange 12 includes a shoulder 14 embodying a seating surface 14a designed to oppose or seat against an opposing surface 14b in the flange 11. Similarly, the flange 11 embodies a shoulder 15 having a seating surface or end face 15a designed to be in opposing relationship to an end face 15b of the female flange 12. The surfaces 14a–14b and 15a–15b are not usually provided for the purpose of sealing or, in fact, seating except under certain conditions. These conditions will be subsequently described as the specification proceeds.

A sealing member 16 is radially interposed between the shoulder or stepped portion 15 of the male flange 11 and a radially overlapping shoulder or stepped portion 17 of the female flange 12. The shoulder 17 of the flange 12 is provided with an end face 17a opposing a similar end face 17b provided on the male flange 11.

Considering the seal member 16 in somewhat greater detail, it should be pointed out first of all that the seal member 16 is shown in the drawing of FIG. 1 in a configuration or position it would assume at a time that the coupling 10 is nearly completely made (and a slight vertical space, not shown, would exist between coupling 10 and the flanges) or the flanges 11 and 12 drawn nearly as tightly together as required. Alternatively, FIG. 1 could represent a fully made coupling, as hereinafter explained.

Figures 2, 3:
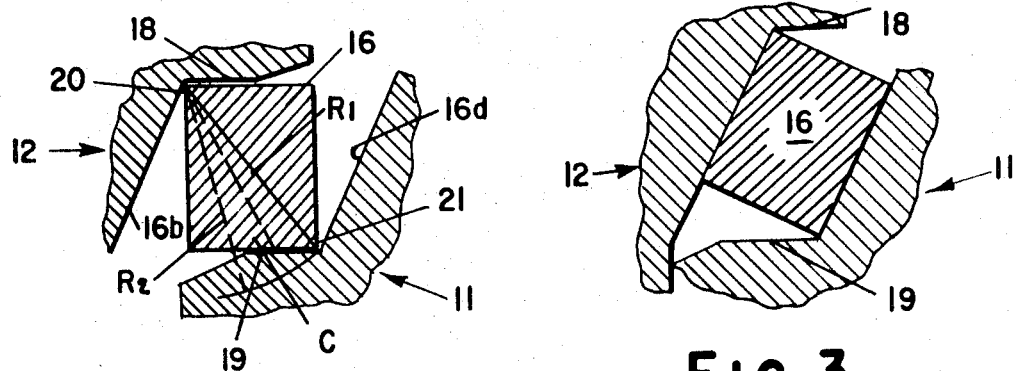
FIG. 2 is a somewhat enlarged partial view of the sealing member embodied in the coupling assembly of FIG. 1, wherein the sealing member is shown in its position before the coupling is made.
FIG. 3 is a view of the sealing member of FIG. 2 after the coupling is made completely; and, FIG. 4 is a sectional view of a modified type of coupling structure embodying a pair of sealing members rather than a single sealing member as shown in FIGS. 1 to 3.

The seal functions may be better understood by first examining FIG. 2 wherein the seal is shown in its position prior to any coupling action of the flanges 11 and 12. It will be seen that the seal is of quadrilateral cross section and preferably comprises a circular ring having a rectangular cross section. It is also preferable that the width of the seal be at least one-half of its height, or stated in other words, that the axial dimension of the seal be at least one-half the radial dimension thereof (the seal of FIG. 1 has a width five-eighths of its radial dimension).

It is essential that the seal be formed of a metallic material, and it is preferable that the seal be formed of a metallic material having certain resilient characteristics and also that the sealing member be formed of a somewhat ductile material. Some type of heat-treated steel is preferred in this regard although some other equivalent metallic materials may be used. It is important, however, that the sealing material not be formed of brittle material such as cast iron or the like, wherein the sealing member may not be subjected to torsional forces as herein after described.

It is essential to the present invention that the sealing member 16 have its outer diameter spaced from the inner diameter of the shoulder 17 of the female flange 12; and, similarly, that the inner diameter of the seal 16 be spaced from the outer diameter 19 of the shoulder 15 of the male flange 11. In the view of FIG. 2, these respective surfaces are designated 18 and 19. Preferably, the clearance between the outer diameter of the seal 16 and the surface 18 should be between 0.001 and 0.010 of an inch for conventional couplings ranging from one-fourth of an inch to approximately 4 inches in diameter. A similar clearance should be provided between the inner diameter of the seal and the surface 19. More importantly, however, a clearance is used which will permit pivoting of the seal about one of its corners only through an arc before a radial force is exerted on that corner edge and the diagonally opposite corner edge of the seal.

Thus, looking at FIG. 2 and assuming that a clamping force is exerted through the coupling structure 10, it is apparent that as the flange 11 moves towards the flange 12, one of the flanges 11 or 12 will first engage the seal 16 at one of its respective corners 20 or 21. Assuming the flange 11 engages the seal 16 at its corner 21, the seal 16 will begin to pivot about its opposite corner 20 through a radius R1 along a curve C. Of course, the dimensions have been somewhat exaggerated in FIG. 2, but it is clear that the seal 16 will pivot about the corner 20 until the clearance between the surfaces 18 and 19 has been used up by the turning of the seal 16 so that the corner edges 20 and 21 become radially seated.

Thereafter, a radial loading on the corner edges 20 and 21 of the seal 16 will cause it to be twisted about its center and at the same time will tend to deform it (or the contacting flange portions depending upon the relative hardnesses of the metals employed) at its corner edges and to strain the shoulders 15 and 17 of the respective flanges 11 and 12.

As this twisting motion and straining takes place, a secondary sealing surface will be formed at S between the shoulders 14 and 15, as shown in FIG. 1. Thus, the shoulder 15 will be forced down into engagement with the shoulder 14 at the same time that the corner edges 20 and 21 of the seal 16 are being loaded.

After such radial loading has been initiated, it is preferable that the seal be rotated some 5° to 15° further such that the diagonal between the sealing corner edges 20 and 21 will be nearly vertical, as shown in FIG. 3. Of course, the arcuate degree of rotation may vary; however, in a preferred embodiment, the seal 16 is rotated to accomplish desired radial loading. The seal 16 is finally seated when the coupling is made as shown in FIG. 3.

It will be noted as the coupling reaches its limit position that the seal 16 has side surfaces 16a and 16c, respectively, which become closer and closer to parallel alignment and engagement with flats 16b and 16d, respectively, of flanges 12 and 11. In a preferred embodiment, the side surfaces 16a and 16c will engage the surfaces 16b and 16d of the flanges 12 and 11, respectively, upon final positioning of the seal 16. The flats 16b and 16d, therefore, may act as seating surfaces to determine the final limits of movement of the seal 16. In the alternative, seating surfaces 14a–14b, 15a–15b, or 17a–17b may be used.

Although it is not essential that the seal 16 be turned to such an angle that its sides 16a and 16c are in engagement as shown in FIG. 3, it is desirable in cases where the coupling assembly may be subject to vibration or large external loads. For example, if the tubular end portions or flanges 11 and 12 are subjected to a differential bending moment or thermal expansion of unusual size, then under such conditions, the load will be carried through the flat faces 16a–16b and 16c–16d, while the sealing pressure is still exerted at the corners 20 and 21.

Of course, as described in the previous referred to copending application, the seal 16 is symmetrical about its midplane (normal to its axis) such that it is reversible and may be used either with the corners 20 and 21 being radially loaded or with the opposite corners being radially loaded. Thus, the seal may be installed in either manner and will function properly. This feature is of important consequence in defense industries where most products must be susceptible of essentially failproof installation and operation.

It is to be noted, as heretofore stated, that when the seal 16 reaches its final position, its corners 20–21 will be on a diagonal which is nearly vertical or in a normal plane to the axis of the coupling. Thus, the corner 20, for example, will not ordinarily be overcenter with respect to the corner 21. It will thus be seen that any slight variation in the position of the flange 11 to 12 will not appreciably vary the sealing force imposed at the radial corners 20 and 21. In other words, the greater incremental radial displacement occurs as during initial movement of the seal 16 from the radius R1 to the radius R2 along the arc C.

By providing the axial width of the seal to be at least one-half of the radial dimension thereof, it is clear that a certain amount of bulk and rigidity is given to the seal. Although in a preferred embodiment, the seal 16 will when coupled have its sides 16a and 16c adjacent to the sidewalls 16b and 16d of the respective flanges 12 and 11, (as shown in FIG. 3), it is not essential that this be the case. In other words, under conditions when vibration is not present and no external loads are being applied, the seating surfaces 14a–14b, 15a–15b, or 17a–17b may be used as the limit means for determining final making of the coupling wherein the seal, for example, could in its final position be in the configuration as indicated in FIG. 1.

It should also be pointed out that the seating surfaces 14a–14, 15a–15b, or 17a–17b could also be used for supplemental axially loaded seals; thus, an annular sealing member is illustratively shown on surface 14a in FIG. 1.

With respect to the clearances hereinabove mentioned, it is desirable to use relatively small clearances in instances in which the seal is to be reused a maximum number of times. If the seal ring 16 is not damaged and does not exceed its elastic limit, it will be possible to use it a considerable number of times in any event.

It will be appreciated that with the embodiment as shown in FIGS. 1 through 3, the primary sealing action takes place at the corners 20 and 21, and a secondary sealing action takes place at the engaging surfaces "S" (as seen in FIG. 1) at such time as the radial loading at the corner 21 forces the shoulder 15 down onto the shoulder 14. Thus, a primary seal is first accomplished when the corners are loaded and then this loading in turn accomplishes the secondary seal at "S."

Figure 4:
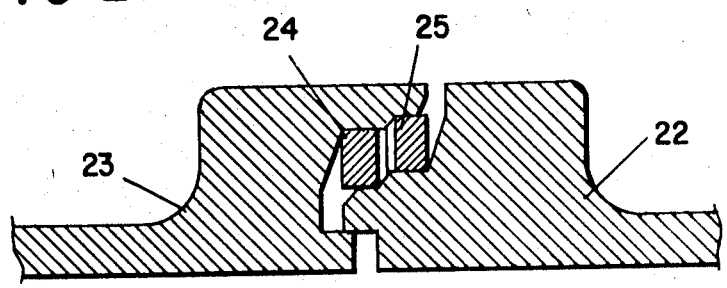

In other embodiments, a plurality of seals may be used in series. Thus, there is shown in FIG. 4 a pair of flanges 22 and 23 which are designed to have radially interposed between them seals 24 and 25. Seals 24 and 25 are constructed exactly the same as seal 16 and positioned in a similar manner between the flanges 22 and 23 as the seal 16 is between the flanges 11 and 12. In this embodiment, however, the seal 24 will have its corner edges sealed and seal 25 will have its corner edges sealed: and, the overlapping shoulders (corresponding to shoulders 14 and 15 of FIG. 1) will create the third seal. Of course, additional seals could be used so that additional sealing edges would be obtained.

With respect to shoulders 14 and 15, it should be mentioned that the overlapping or interlocking relationship shown in FIGS. 1 and 4 may be quite important (depending upon dimensions used) in preventing springing or bending in response to loading of the seal 16; thus, the shoulder 14 prevents bending of the shoulder 15.

It will be appreciated that the modifications and changes may be made in the improved coupling and seal of the present invention without departing from the spirit and scope thereof. In this regard, for example, although it is desirable that the sealing member have a rectangular cross section, it is possible to use it with a trapezoidal cross section or other quadrilateral cross section so long as the sealing member is symmetrical about a midplane normal to its axis, whereby it is reversible and cannot be installed incorrectly.

The most essential feature of the present invention is that the seal be loaded only at its corner edges such that all the force is concentrated at such edges rather than distributed over a surface area.

We claim:

1. In a coupling assembly, a pair of tubular fluid passage-defining structures, means for relatively drawing said structures axially together to assemble said structures in coupled relation to each other, said structures defining therebetween an annular cavity in assembled relation, a sealing ring of resilient metal disposed in said cavity and having at least diagonally opposite corner edges, said structures engaging said ring only at said diagonally opposite corner edges during said axial movement to torsionally deflect said ring and to thereby compressively, radially load said ring only at said corner edges upon predetermined axial displacement of said structures for establishing a fluidtight seal at the line of contact between each of said corner edges and the engaging one of said structures when said structures are axially drawn together, said ring being engaged only at said corner edges to establish the fluidtight seals between said corner edges and said structures.

2. The coupling assembly defined in claim 1 wherein said cavity is formed with opposed, diagonally related corners, and wherein said diagonally opposite corner edges respectively seat in said corners when said ring is torsionally deflected by drawing said structures axially together.

3. The coupling assembly defined in claim 2 wherein said ring is formed with a polygonal cross section.

4. The coupling assembly defined in claim 2 wherein said ring is formed with a quadrilateral cross section to define said diagonally opposite corner edges and an additional pair of diagonally opposite corner edges, there being sufficient clearance provided between each of said structures and said ring that said additional pair of corner edges are spaced from said structures during torsional deflection of said ring.

5. The coupling assembly defined in claim 4 wherein said structures are respectively formed with first and second annular end portions that axially overlap in radially spaced apart relation when said structures are drawn axially together, said ring being disposed between said end portions.

6. The coupling assembly defined in claim 5 wherein said structures are respectively formed with first and second tubular body portions, and wherein said first and second end portions are respectively rigid with and extend axially from said first and second body portions, said first and second body portions respectively having first and second opposing annular wall surfaces delimiting said cavity, said first annular wall surface being disposed radially inwardly of said first end portion and intersecting said first end portion at a juncture to define one of said corners, said second annular wall portion being disposed radially outwardly of said second end surface and intersecting said second end portion at a juncture to define the other of said corners, said ring being disposed between said first and second annular wall surfaces.

7. The coupling assembly defined in claim 6 wherein each of said annular wall surfaces are sloped at an angle relative to a radial plane to provide a clearance between each body portion and said ring as said ring is torsionally deflected.

8. The coupling assembly defined in claim 6 wherein said ring in its final fluid seal-establishing position is spaced from said annular surfaces.

9. The coupling assembly defined in claim 6 wherein said annular surfaces provide stop abutment surfaces for limiting movement of said ring.

10. The coupling assembly defined in claim 6 wherein each of said structures is a one-piece tubular member.

11. In a coupling assembly, a pair of tubular fluid passage-defining structures, means for relatively drawing said structures axially together to assemble said structures in coupled relation, said structures defining therebetween an annular cavity in assembled relation, said structures having radially spaced apart, circumferentially extending surfaces delimiting said cavity, a sealing ring of resilient metal disposed in said cavity and being torsionally deflectable by engagement with said structures, said sealing ring having inner and outer peripheries and a pair of diagonally opposite corner edges respectively disposed at said inner and outer peripheries, and said sealing ring being dimensioned in its undeflected condition to provide a predetermined clearance between at least one of said peripheries and an opposing one of said circumferential surfaces, said structures engaging said ring only at said diagonally opposite corner edges during said axial movement to torsionally deflect said ring and to thereby increase the effective radial dimension of said ring through its cross section to the extent provided by said clearance for compressively radially loading said ring at said corner edges and thereby establishing fluidtight seals along the two lines of contact between said corner edges and the respective structures, said ring being loaded only at said corner edges to establish said seals.

12. The coupling assembly defined in claim 11 wherein said structures are formed with additional surfaces delimiting said cavity and respectively transversely intersecting with said circumferential surfaces to define opposed, diagonally related corners, and wherein said diagonally opposite corner edges respectively seat in said corners, upon torsional deflection of said ring.

13. The coupling assembly defined in claim 12 wherein said ring is formed with a polygonal cross section.

14. The coupling assembly defined in claim 12 wherein said ring is formed with a quadrilateral cross section to define said diagonally opposite corner edges and an additional pair of diagonally opposite corner edges, there being sufficient clearance provided between each of said structures and said ring that said additional pair of corner edges are spaced from said structures during torsional deflection of said ring.

15. The coupling assembly defined in claim 12 wherein said structures are respectively formed with first and second annular end portions that axially overlap in radially spaced apart relation when said structures are axially drawn together, said first and second end portions respectively defining said circumferentially extending surfaces.

16. The coupling assembly defined in claim 15 wherein said structures are further respectively formed with first and second tubular body portions that define said additional surfaces, and wherein said first and second end portions are respectively rigid with and extend axially from said first and second body portions.

17. The coupling assembly defined in claim 11 wherein each of said structures is a tubular member, and wherein said tubular member having cooperating surfaces for limiting torsional deflection of said ring.

18. The coupling assembly defined in claim 11 wherein said ring is solid in cross section and composed of torsionally resilient steel.

19. The coupling assembly defined in claim 11 wherein said corner edges are deformed upon radially loading said ring.

20. The coupling assembly defined in claim 11 wherein said structures have portions that are brought into sealing engagement, one with the other, by radially loading said ring to provide a secondary seal between said structures.

21. In a coupling assembly, a pair of tubular fluid passage-defining structures, means for relatively drawing said structures axially together to assemble said structures in coupled relation to each other, said structures defining therebetween an annular cavity in assembled relation, a sealing ring of resilient metal disposed in said cavity and having at least two corner edges radially and axially spaced apart with respect to each other, said corner edges being respectively disposed at the inner and outer peripheries of said ring, said structures engaging said ring only at said corner edges during said axial movement to torsionally deflect said ring and to thereby compressively, radially load said ring at said corner edges upon predetermined axial displacement of said structures for establishing a fluidtight seal at the line of contact between each of said corner edges and the engaging one of said structures when said structures are axially drawn together, said ring being loaded only at said corner edges for establishing the fluidtight seals between said corner edges and said structures.

22. In a coupling assembly, a pair of tubular fluid passage-defining structures, means for relatively drawing said structures axially together to assemble said structures in coupled relation to each other, said structures defining therebetween an annular cavity in assembled relation, and said structures having diagonally opposed corners delimiting said cavity, a sealing ring of resilient metal disposed in said cavity and having at least a pair of diagonally opposite corner edges, said corner edges being respectively disposed at the inner and outer peripheries of said ring, said structures engaging said ring only at said diagonally opposite corner edges during said axial movement to torsionally deflect said ring about its cross section and thereby seat said corner edges in said corners for compressively, radially loading said ring at said corner edges to establish a fluidtight seal at a line of contact between each of said corner edges and the engaging one of said corners when said structures are axially drawn together.

* * * * *

UNITED STATES PATENT OFFICE
CERTIFICATE OF CORRECTION

Patent No. 3,625,552          Dated December 7, 1971

Inventor(s) George A. Mahoff and Leonard L. Rice

It is certified that error appears in the above-identified patent and that said Letters Patent are hereby corrected as shown below:

Column 5, line 67, (Claim 6), change "portion" to --surface--.

Column 5, line 68, (Claim 6), change "surface" to --portion--.

Signed and sealed this 29th day of August 1972.

(SEAL)
Attest:

EDWARD M. FLETCHER, JR.
Attesting Officer

ROBERT GOTTSCHALK
Commissioner of Patents